Figure 5:
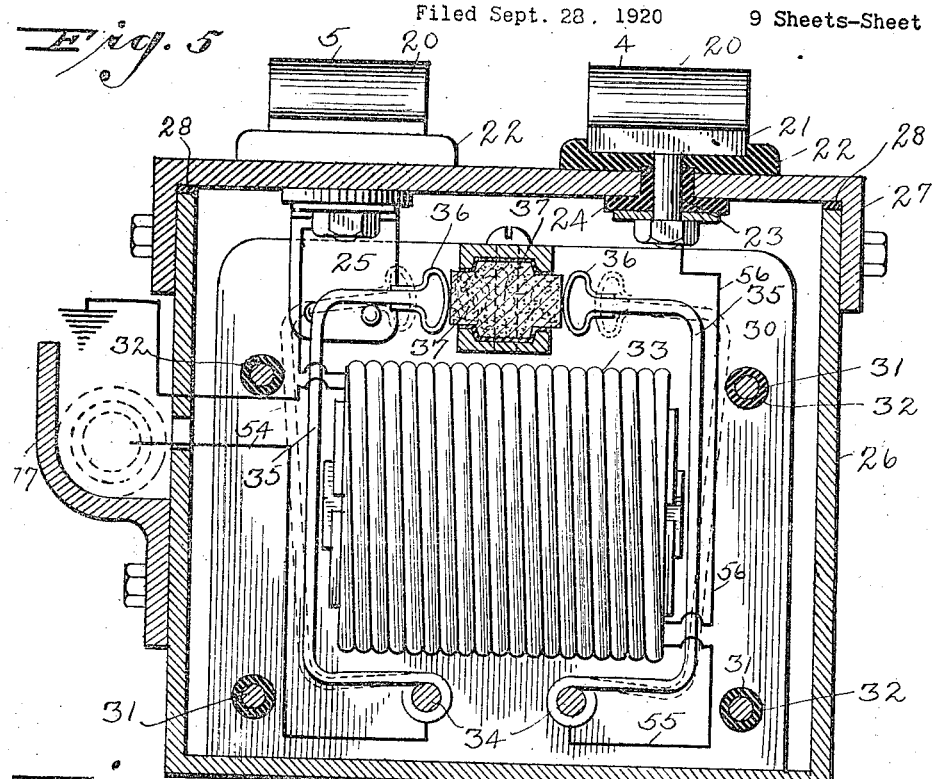

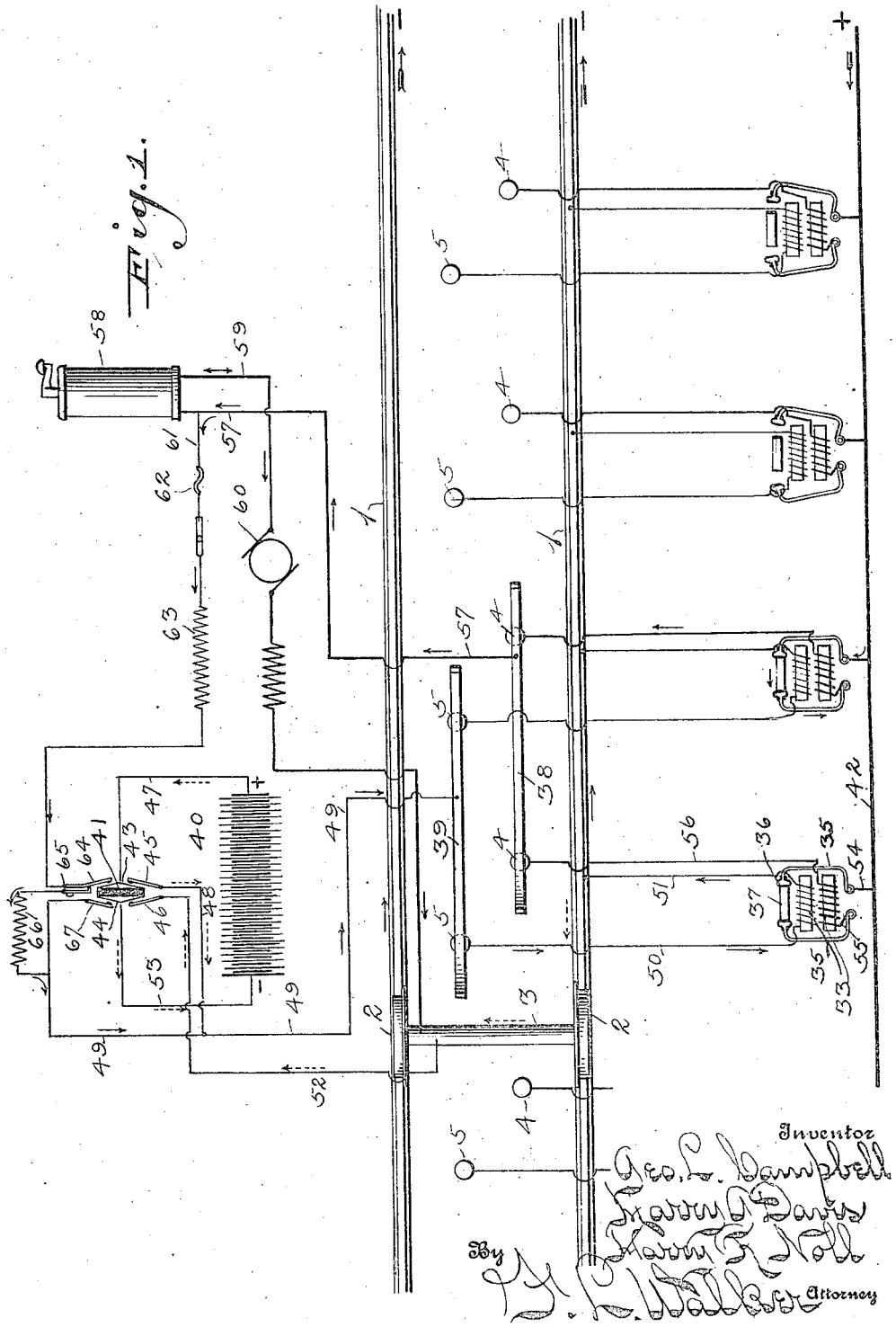

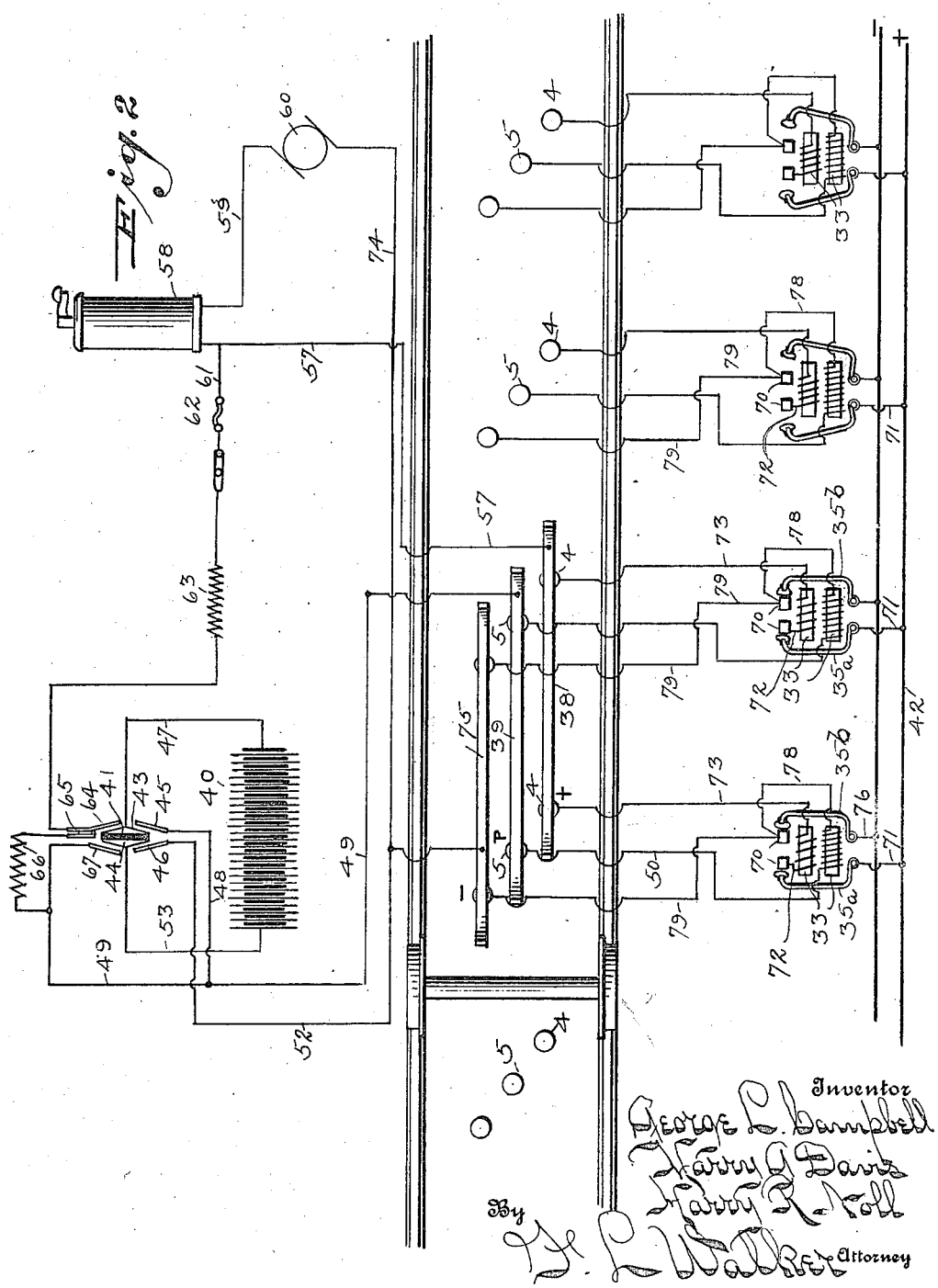

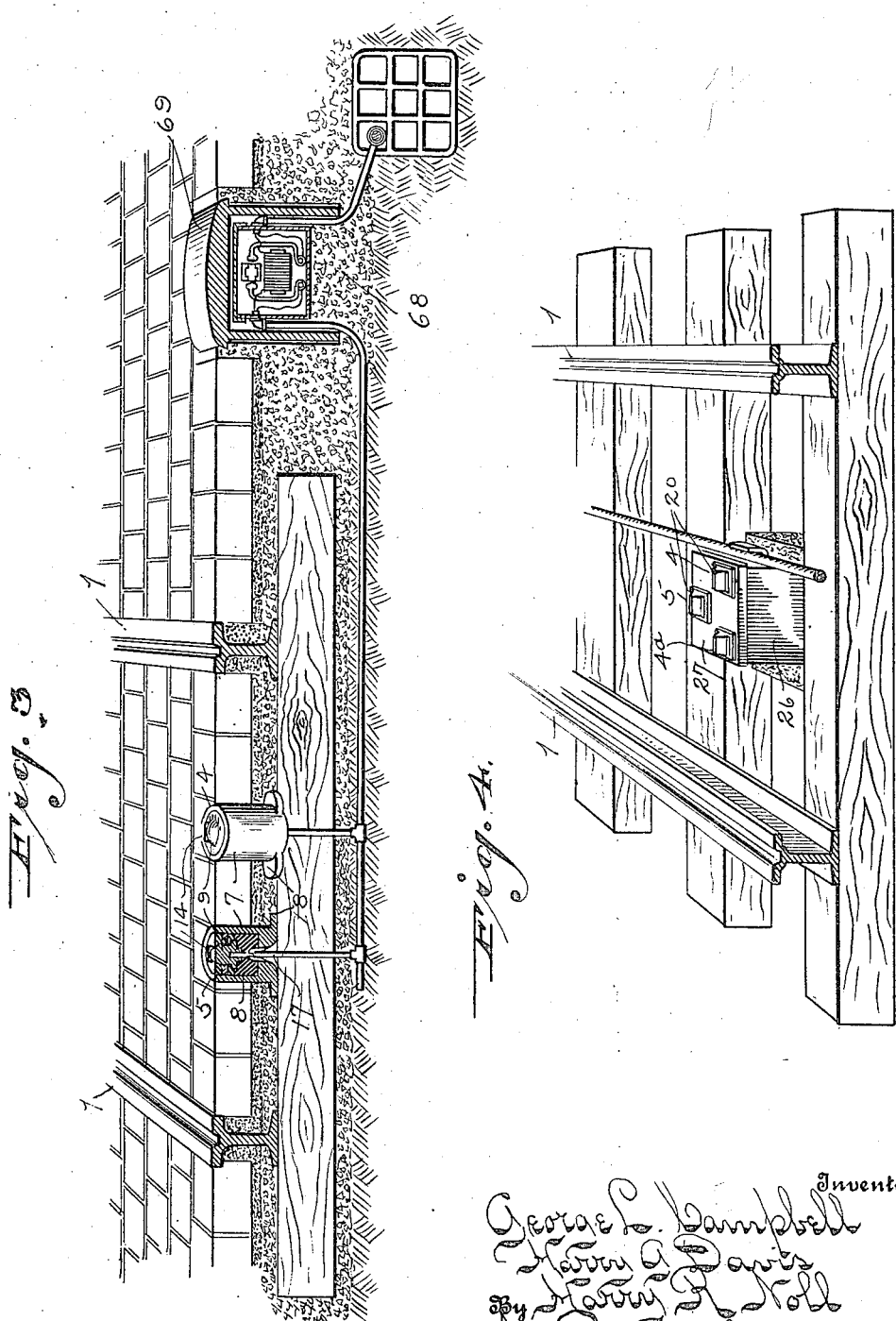

Sept. 30, 1924.

G. L. CAMPBELL ET AL 1,510,383

ELECTRIC TRACTION SYSTEM

Filed Sept. 28, 1920    9 Sheets-Sheet 4

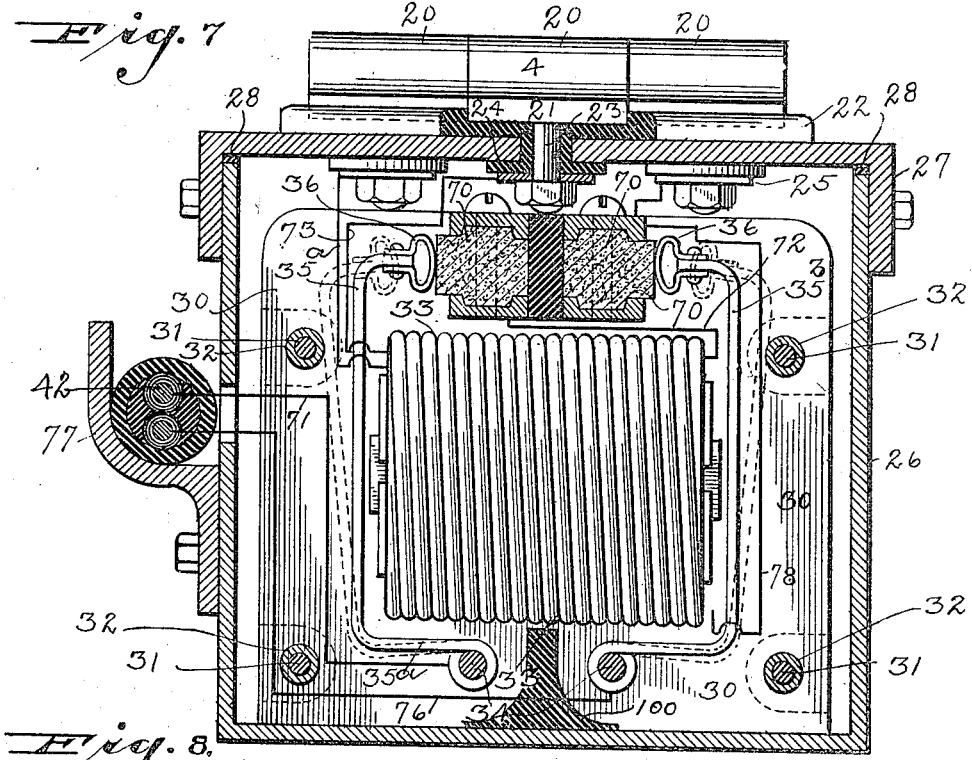
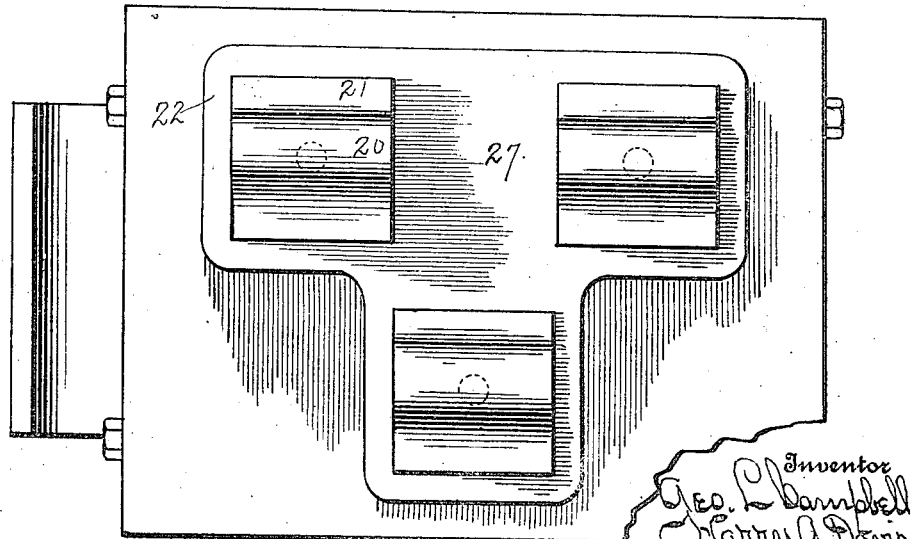

Sept. 30, 1924.   G. L. CAMPBELL ET AL   1,510,383
ELECTRIC TRACTION SYSTEM
Filed Sept. 28, 1920   9 Sheets-Sheet 6
Fig. 10   Fig. 11
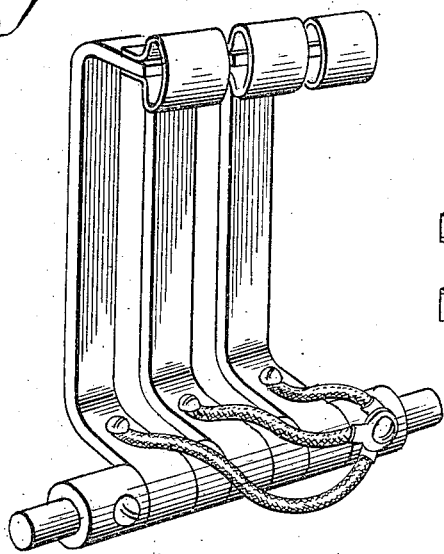
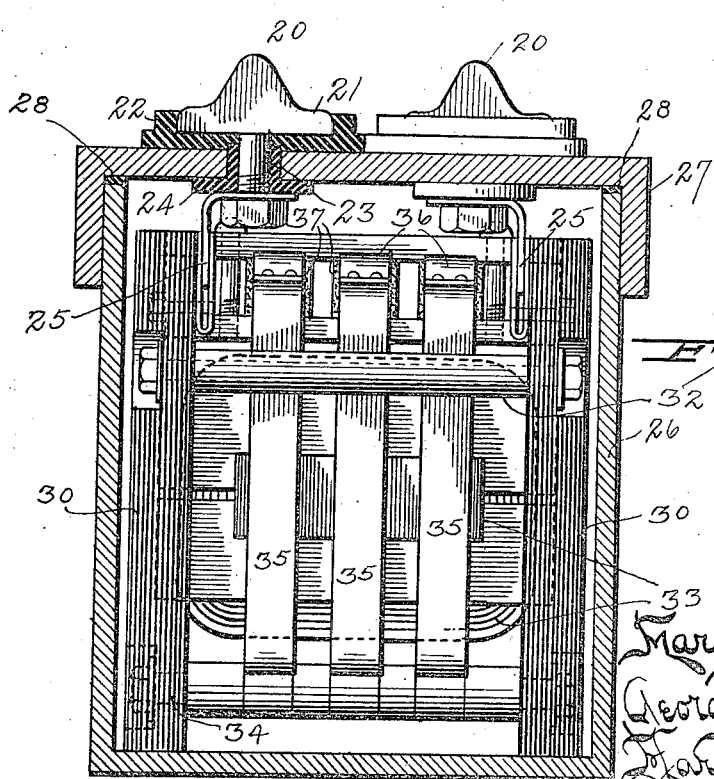
Fig. 9

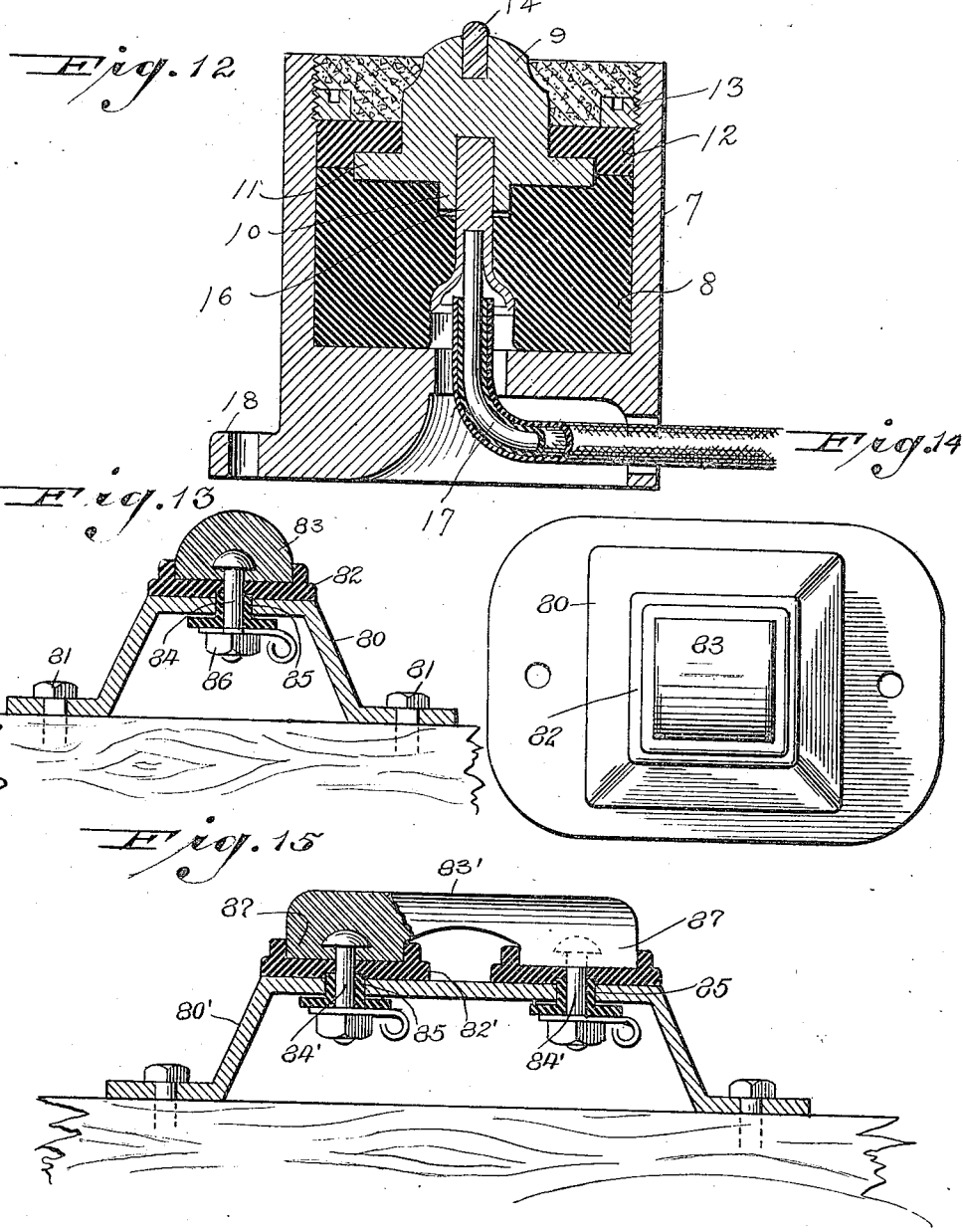

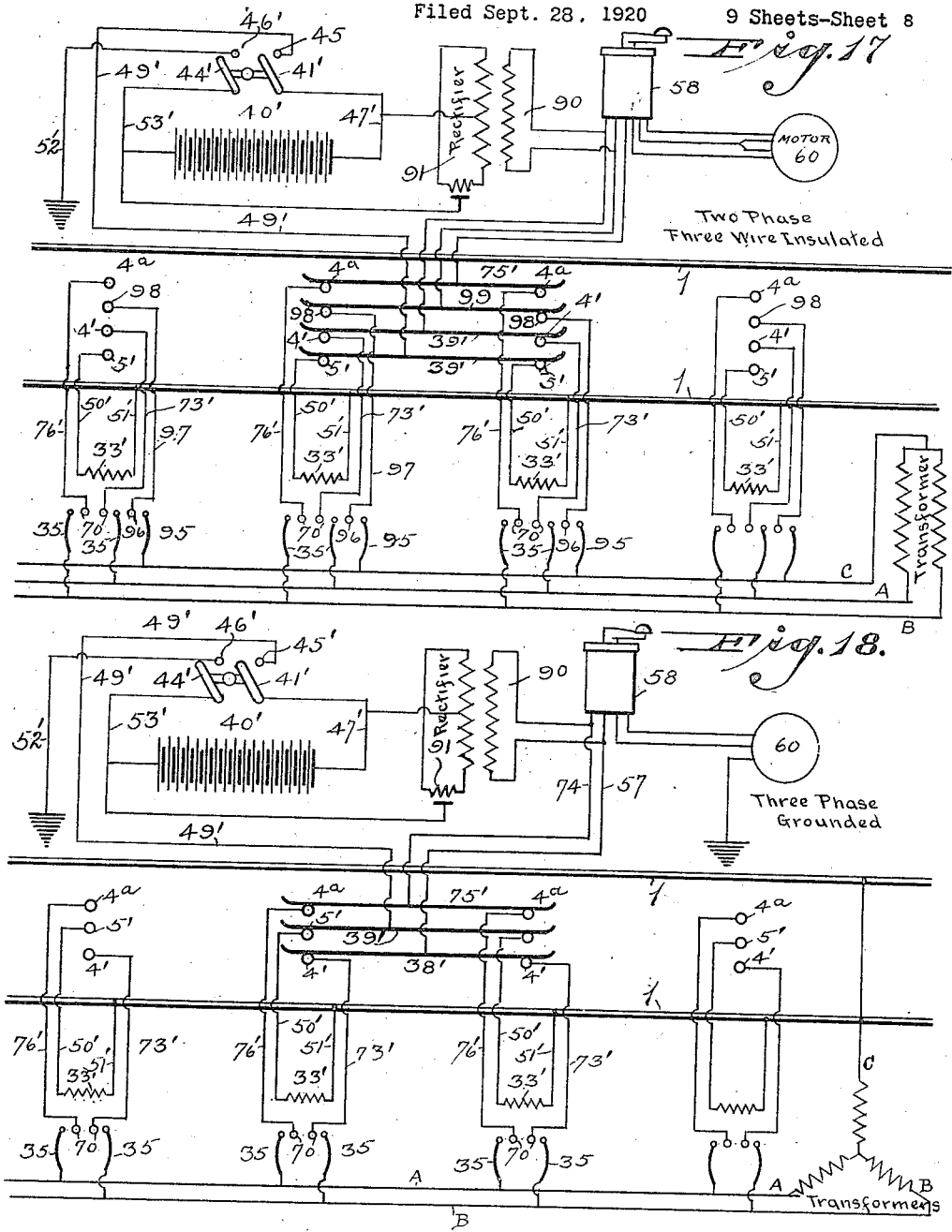

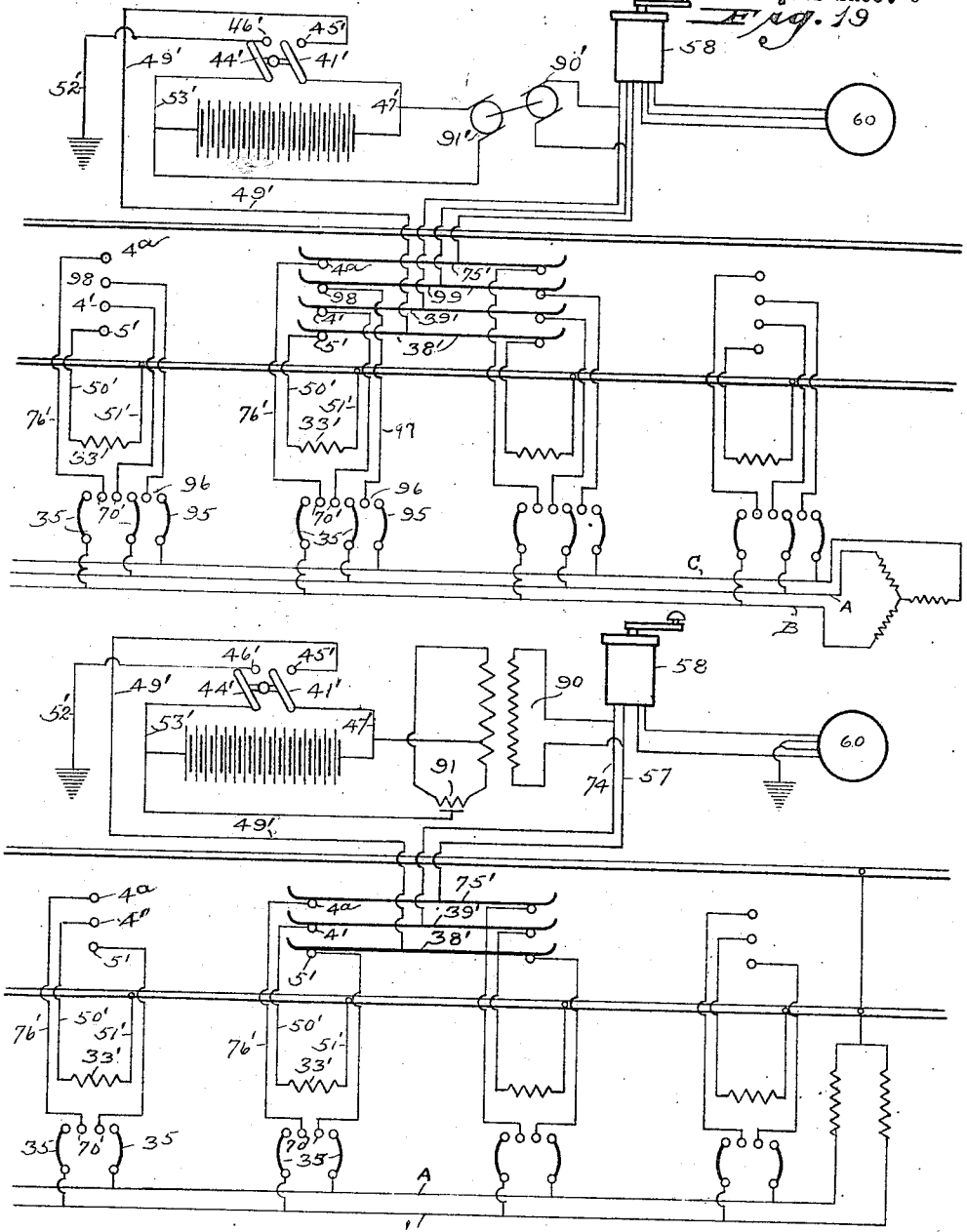

Patented Sept. 30, 1924.

1,510,383

UNITED STATES PATENT OFFICE.

GEORGE L. CAMPBELL, OF PHILADELPHIA, HARRY R. NOLL, OF WILLIAMSPORT, AND HARRY G. DAVIS, OF PHILADELPHIA, PENNSYLVANIA, ASSIGNORS, BY MESNE ASSIGNMENTS, TO SAMUEL P. CURTISS, OF PHILADELPHIA, PENNSYLVANIA.

ELECTRIC TRACTION SYSTEM.

Application filed September 28, 1920. Serial No. 413,369.

*To all whom it may concern:*

Be it known that we, GEORGE L. CAMPBELL, of Philadelphia, county of Philadelphia, State of Pennsylvania, HARRY R. NOLL, of Williamsport, county of Lycoming, State of Pennsylvania, and HARRY G. DAVIS, of Philadelphia, county of Philadelphia, and State of Pennsylvania, all citizens of the United States, have invented certain new and useful Improvements in Electric Traction Systems, of which the following is a specification.

This invention relates to improvements in electric railways, and more particularly to a surface contact system of the intermittent or sectional conductor type, wherein limited lengths of the system are successively energized or electrically connected in circuit in unison with the travel of the car or vehicle.

The invention pertains especially to a magnetic type of sectional conductor systems wherein successive contacts are automatically closed by magnetic influence in advance of the car or vehicle to progressively connect the contacts to be engaged by the car or vehicle, with the feed or supply conductor, leaving each contact as it is passed dead or de-energized when the vehicle has passed therebeyond.

The object of the invention is to improve the structure as well as the means and mode of operation of such electric systems whereby they will not only be cheapened in construction but will be more efficient in use, positive in operation, automatic in action, of increased safety, easily controlled and unlikely to get out of repair.

A further object of the invention is to provide improved means for automatically closing the circuit at successive stations in unison with the travel of the car or vehicle, and to provide an improved form of circuit closers which will afford the passage of maximum current while avoiding any tendency to arc, and to burn or weld in their engaged or contacting positions.

A further object of the invention is to provide a system of this character having a wide range of practical application, with maximum flexibility to meet varying conditions of use, and capable of operation by either direct or alternating current, thru either a grounded or common rail return, or an insulated metallic return system.

With the above primary and other incidental objects in view as will more fully appear in the specification, the invention consists of the features of construction, the parts and combination thereof, and the mode of operation, or their equivalents as hereinafter described and set forth in the claims.

Figure 6:
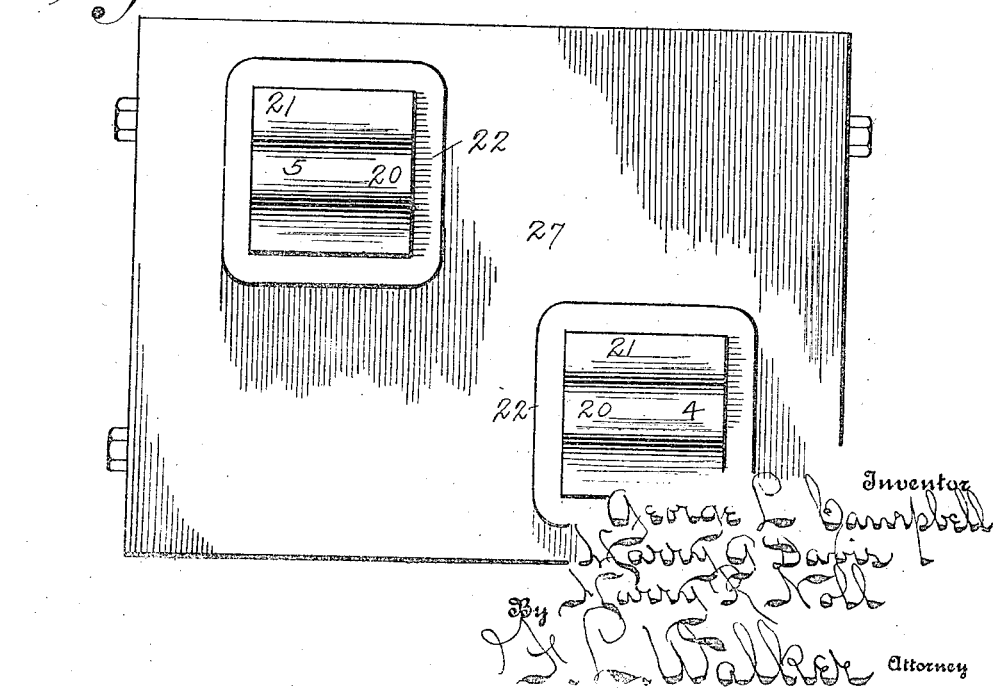

The preferred form of embodiment of the invention is illustrated in the drawings in which Fig. 1 is a diagrammatic view of the electrical circuit comprising the grounded or rail return system. Fig. 2 is a similar view of the electrical circuit composing the metallic return or insulated system. Fig. 3 is a transverse sectional view of a road bed illustrating an installation for any traffic in which the circuit closer or control mechanism is offset to one side of the track, and electrically connected with detached surface contact studs, positioned in the path of travel of the car or locomotive. Fig. 4 is a somewhat similar view illustrating an open track installation, particularly adapted for industrial or mine purposes, or for those conditions wherein the trackage is more or less temporary. Fig. 5 is a transverse sectional view of the housing or container for the circuit closing or control devices, showing therein the mechanism for the grounded or rail return system. Fig. 6 is a top plan view of the circuit closer housing for the grounded or rail return system, showing the location of the direct connected contact studs. Figs. 7 and 8 are similar views illustrating the control mechanism or circuit closers for the insulated or metallic return system, and the arrangement of the direct connected contact stud upon the top of such box or housing. Fig. 9 is a transverse sectional view of the housing and end elevation of the circuit mechanism, which for purposes of illustration may be considered as applicable to both the grounded system illustrated in Fig. 5 and the metallic return system illustrated in Fig. 7. Fig. 10 is a detail perspective view of one series of vibratory armatures or contact arms, by which the circuit is intermittently closed. Fig. 11 is a detail perspective view of the stationary contact engaged by the vibratory arms shown in Fig. 10. Fig. 12 is a vertical sectional view of a detached contact stud, particularly adapted for standardized street railway and other transportation installations. Fig. 13 is a transverse sectional view and Fig. 14 a top plan view of a contact stud particularly applicable to industrial and mining railway installation, wherein the contact is mounted in the open track, upon the cross ties thereof. Fig. 15 is a sectional view of a modification, of the contact member disclosed in Figs. 13 and 14, for installation upon curves in the track to accomodate the lateral deflection of the contact shoes hereafter described. For illustrative purposes, Fig. 13 may be considered a transverse sectional view of a form of stud shown in Fig. 14 for straightway trackage or a transverse sectional view of the stud shown in Fig. 15 for curved trackage. Figs. 16, 17, 18 and 19 are diagrammatic views of modifications of the electrical circuits, by which the system is adapted to alternating current. Figs. 16 and 17 illustrate a two phase alternating current system, of the open or grounded type and the closed or metallic return type respectively. Figs. 18 and 19 illustrate a three phase alternating current system of the open or grounded type, and the closed or metallic return type, respectively.

Like parts are indicated by similar characters of reference throughout the several views.

The present system is applicable to a wide range of uses for both industrial and general transportation purposes. It is employed in large manufacturing establishments and construction work for the transportation of materials, for "drilling" freight cars, in railway yards, for efficient operation of freight spurs, in the operation of Gantry and other cranes, for pier and terminal operation, and particularly for underground as well as surface mine operation. For industrial purposes, this system possesses the advantage of embodying no magnetic shoes or exposed magnets which might tend to collect stray bits of metal, which would interfere with the operation of the vehicle. Moreover, the system is applicable not only to track operated vehicles, but for industrial purposes particularly in the interior of buildings. It may be adapted to the use of rubber tired or other wheeled vehicles, by embedding the contact studs in spaced relation in the concrete flooring, to be engaged by the contact shoes of the vehicle. In its application to commercial transportation of passengers and freight, it may be substituted for the usual overhead trolley, slot or third rail systems, over which it possesses the advantages of lowered maintenance costs, no overhead wires, or other charged conductors in exposed positions, and no openings in the street or roadway. The system as herein described employs the ordinary cross tie track construction, and is readily applicable to existing trackage. The installation does not necessarily extend below the cross ties, and the sealed boxes for the automatic control mechanism may be placed between the track over the conduit carrying the feed wires, or they may be offset to one side of the track or elevated upon poles or in industrial installations upon the walls of the building, or the mine tunnel. The system is adapted to varying loads, and to amperage of from one hundred to fifteen hundred amperes, without in any way changing the standardized construction of the units. Systems of this type are essentially automatic in their operation. To be safe, reliable and efficient, it is imperative that the surface contact studs be "alive" or charged with current only so long as the conductor shoes upon the vehicle are in engagement therewith, at which time they are covered or protected by the car or locomotive, and it is equally imperative that these studs be positively "dead" or deenergized, when not so protected and exposed to be touched or stepped upon.

Briefly stated the present system embodies a series of sealed housings or circuit closer boxes arranged at spaced intervals throughout the length of the track, with which are associated surface contact studs to be engaged by the car or vehicle and separated one from the other, distances slightly less than the length of the car or train to be operated upon such track. Within these sealed housings or boxes are enclosed automatic circuit closers actuated by magnetic influence of electro-magnets mounted within the housing or box to automatically connect a normally disconnected feed wire or cable with the surface contacts. These contacts are in turn engaged progressively by contact shoes or similar elements carried by the car or train. By the engagement of such contact shoes with the surface studs, an initial or pick-up shunt circuit is established thru the succeeding control magnet which causes the closing of the main circuit to be automatically effected thru the driving motor thence returning either thru the rail and ground, or thru an independent return line.

The surface contacts electrically connected by the automatic closing of said circuit closers within the boxes or housings are so positioned in relation one with the other that the contact shoe or analogous element carried by the car or train will engage each succeeding surface contact before breaking its engagement with the preceding contact. Thus the car or train is electrically connected with the feed or supply cable thru alternating single and double surface contacts. That is to say, the shoe as it progresses along the track receives current from two adjacent surface contacts with which it simultaneously engages. It then breaks its engagement with one of said contacts, receiving its entire supply of current thru the remaining contact until its forward end engages a succeeding surface contact. Thereupon the current is again supplied thru two such contact points. Local battery current is provided upon the car or train for initially actuating the pick-up or circuit closing mechanism. It will be understood that after the circuit has been once closed, current from the main line successively effects the closing of the succeeding circuit closures. The local battery circuit affords only the initial influence to set in operation the train of magnetic operation. It is provided for temporary use only, and is manually controlled by the operator, when leaving the car barn, or in the event that the current is temporarily cut off, leaving the car or train and engaged surface contacts temporarily dead.

*Grounded system.*—Referring particularly to the grounded system shown diagrammatically in Fig. 1, 1—1 are the rails of the track, over which travel the wheels 2 of the car truck carried upon the axle 3. In practice, the rails 1 are mounted upon suitable cross ties, the intermediate space being filled by a body of concrete, upon which are laid the usual paving blocks or bricks. This is the usual road-bed construction in cities. For industrial, mine, and cross country installations open trackage may be employed. There are mounted at regular spaced intervals intermediate the rails 1, two alined series of circuit contact studs. These circuit studs are arranged in pairs, and known respectively as power studs 4, and pick-up studs 5. The studs 4 and 5 may be located directly on top of the circuit closer housing or box as shown in Figs. 4 to 9, or the housing may be located at one side of the track, and detached studs such as shown in Fig. 3 and Figs. 12 to 15, are connected therewith by branch conductors. The detached type of stud as disclosed in Figs. 3 and 12 comprises a chambered housing 7, in which is located a block 8 of insulating material, supporting a contact head 9. The contact head 9 is formed with a boss 10 and peripheral flange 11. The top of the insulating block 8 is recessed to form a socket or seat to receive the boss 10 and flange 11, whereby the contact head 9 is supported stationarily in a central or concentric position in relation with the stud box or housing 7. The head 9 is removably secured in position by an overlying insulation collar 12, which engages the upper surface of the flange 11, and is caused to bear thereon by an adjusting ring 13, screw threaded into the open end of the stud housing 7. After being secured in position, the portion of the housing 7 above the collar 12 is filled with asphalt or other sealing material, which not only serves to retain the parts in their adjusted position, but also to prevent the entrance of water or moisture. The top or crown of the head 9 is provided with a hardened steel contact 14, with which engage the contact shoes carried by the vehicle. The contact 14 may be of manganese steel, bronze or other suitable materials, having wear resisting qualities. This contact piece 14 is removably engaged with the head 9 whereby the contact may be readily replaced when worn.

Extending thru the insulating block 8, and projecting within a suitable bore in the head 9, is a terminal pin or stud 16 to which is connected an electrical conductor 17, leading from the circuit closer box hereafter described. This construction affords a convenient electrical connection of the contact head 9 and electrical conductor 17, which enables the head to be readily detached for replacement or repair without disturbance of the housing 7 and conductor connections. The stud housing 7 is adapted to be fixedly secured to the cross ties of the track, by being spiked or bolted thru radial ears 18, but in concrete construction such as shown in Fig. 3, the housing 7, may be permanently embedded in the grouting or concrete forming the road-bed.

In lieu of the detached contact stud construction, shown in Figs. 3 and 12, the circuit controller box itself may be located in the road-bed intermediate the rails 1, and be provided with circuit contact heads 20, as shown in Figs. 4, 5, and 6. These contact heads 20 are somewhat prismatic in form having a rounded top angle for engagement with the contact shoe, carried by the vehicle. The heads 20 are provided with laterally projecting base flanges 21, and are seated in suitable insulating sockets 22, located on the top or lid of the circuit closer housing. The heads 20 are provided with dependent studs 23, extending thru the sockets 22, and thence thru the lid of the circuit closer housing from which it is insulated by a suitable bushing of insulating material, as at 24, and carry within the housing suitable clips, or connectors 25, for the electrical circuit connections hereafter mentioned. The connectors 25 resemble knife blade switch connections and enable the removal of the lid of the closure box for inspection or repairs without the necessity of exposed electrical connections. The circuit closer devices whether the same be track located as in Fig. 4 or offset to one side of the track and interconnected with contact studs in the path of travel of the vehicle as in Fig. 3 are the same in general construction.

*Circuit closer.*—The circuit closer as particularly disclosed in Figs. 5, 6, and 9 is contained within a housing or box 26 of any suitable composition or material, but which for convenience may be of cast iron or of sheet metal. This housing or box 26 is preferably rectangular in form and is provided with a removable cover 27, which in the case of the track located construction before mentioned, carries the circuit contact heads 20. The lid 27 as shown in the drawing is provided with dependent marginal flanges enclosing the wall of the container 26, and resting upon strips of packing 28, which serve to seal the box against the entrance of water or vapors. Located within the container 26 are side plates or frames 30, of insulating material, interconnected one with the other in spaced relation by tie bolts 31 which carry intermediate the side plates or frames 30, spacer tubes 32. Supported intermediate the side plates or frames 30 is a double wound electro-magnet 33, arranged with its axis parallel with the side plates or frames 30. While the coil 33 may be variously wound to meet different operating conditions, or to afford different capacities an illustrative winding would consist of a shunt or fine winding of approximately nine hundred turns of No. 17 S. C. C. wire, next to the core, and a series winding of ten to twelve turns of No. 7 D. C. C., well insulated from the shunt or fine winding, and so connected that the magnetic action is cumulative, affording a compound winding. Such winding will be found suitable for general purposes, but in offering this illustrative winding, there is no intent to limit the invention to these details.

Pivotally mounted upon transverse shafts 34, carried by the side frame 30 beneath the coil 33, are two series of U-shaped oscillatory armatures or contact arms 35. These contact arms extend within the magnetic range of the electro-magnet 33 and are attracted thereto when such coil is energized. Upon their release from the influence of the magnet 33, these armature arms or contact arms fall outwardly away from the magnet 33 under the influence of gravity and the repulsive action of the coil when the circuit through the magnet 33 is broken. Upon the opening of the circuit by the passing of the shoe off the contact, the de-energization of the coil effects a momentary reversal of current within the coil which tends to destroy the residual magnetism, effecting the repulsion of the armature arms. In their normal or inoperative positions (shown by dotted lines) the armature or contact arms rest against the uppermost tie bolts 31, and spacer tubes 32 carried thereby. There are preferably a considerable number of these arms in each series. The arms are independent of each other, and move freely about their pivotal shaft 34 to and from the coil 33. Each armature arm or contact arm 35 carries a terminal contact head 36, which when the arm is attracted by the magnetic coil 33, engages a stationary contact positioned transversely above the coil 33, intermediate the side plates or frames 30.

The contact mechanism may embody any number of oscillatory armatures or contact arms 35. In the drawings, Figs. 5 to 10 inclusive each contact mechanism has been shown as embodying two sets of three armature or contact arms each, the sets or series being oppositely disposed when assembled. Between the contact heads 36 of these arms and carried by transverse supporting bars mounted in the side plates 30 are a plurality of independent stationary contact blocks 37, which may be of copper, carbon, graphite or other electrically conductive material. These stationary contact blocks 37 are insulated from each other and from their supporting bars. Each block is adapted to be engaged on its opposite sides by the respective members of the corresponding pair of oscillatory armature arms 35. The arrangement is such that when the arms are in operated positions, the stationary contact blocks 37 separately connect an oscillatory armature arm of one series with the corresponding armature arm of the opposite series. When the contact is closed, by the approach of a car or vehicle, both sets of armature arms or contact arms 35 are drawn forcibly against the interposed stationary contact blocks 37, but on opposite sides thereof. Upon the simultaneous engagement of the interposed contact blocks by the contact arms 35 of the opposite series, a connection, hereafter traced is established from the feed wire up one set of contact arms thru the contact blocks and down the other set of arms and thence to the stud in the track. The magnetic coil is initially energized by current thru the shunt winding or fine winding before mentioned, thereby actuating the arms 35 to close the main circuit thru said arms and the intermediate contact block as before mentioned.

By providing a plurality of independently movable arms 35 in each series, any chatter or jar of these arms incident to the passing of the vehicle or train, will not materially affect the closed circuit. When a plurality of pairs of such arms are simultaneously engaging their independent contact blocks 37, any one of which is sufficient to carry the current, the vibration of these arms will not occur in unison, and although some one or more of the contact arms may be momentarily disengaged from their block 37, there will always be a sufficient number of arms engaged therewith to maintain a closed circuit, so long as the arms are held in their closed or attracted position by the magnet 33. The use of a plurality of independently movable arms in each series, further obviates any tendency toward arcing due to the vibration of the arm. Inasmuch as some arms will be in full contact during the time that others are momentarily disengaged, no arcing can occur between the disengaged contact head 36 and the bar 37 since under such circumstances the current is shunted thru the fully closed arm. Moreover, the circuit closing engagement of the contact head 36 with the block 37 occurs in the magnetic field of the coil 33. Sparking or arcing between the contact surfaces will not be effected within the magnetic field, hence the danger of welding or burning the contact surfaces is reduced to a minimum.

Separating the stationary contact member into three or more separate insulated sections, affords a guarantee of safety impossible to attain in any other manner. The vital features in a system of this character is the automatic circuit closing mechanism employed. If this mechanism is liable to stick either electrically or mechanically and leave a "live" stud in the street after the car has passed, then the whole system is dangerous no matter how elaborately it may be designed otherwise.

To afford an automatic circuit closing or contacting mechanism so simple and dependable in its construction, that it may be buried and sealed underground and relied upon to perform its functions for long periods of time without attention or repairs, and such that if any derangement or failure to operate, should occur, such failure would be upon the side of safety, is attained by the present construction.

Each armature or contact arm 35 operates independently of the other arms. Each pair of oppositely disposed armatures or contact arms 35 engage their own independent insulated section of the stationary contact 37. Therefore, if an armature arm or contact arm 35 of one, two or more different pairs of such arms should adhere in closed position, no current could flow to the stud in the street or track, and there would be no danger. Directly opposite contact or armature arms 35 must engage their intermediate contact blocks 37 at the same time before current can flow to the stud in the track or street, and only in the event that two such oppositely disposed armature arms should fail to release, could the stud remain alive after the car or vehicle had passed. In the closed or metallic return circuit operation in which the rail return for current is not employed, two oppositely disposed contact arms in two separate mechanisms, at the same set of track studs or surface contact must stick or fail to release at the same time, and in addition, the separate surface contact stud in the street or track be bridged in some way before any danger of a shock from live studs could be possible. The chance of such failure is very remote, and under long continued and varied tests such a failure to break the circuit has never occurred.

When the contact is broken, a double air gap is formed as each set of armature or contact arms pull away from the intermediate contact blocks 37, and forms a gap on its own side of the contact bar. This introduces a double element of safety against arcing within the box which is the only point within the system where arcing could possibly occur.

There are provided upon the truck of the car or vehicle, two elongated contact shoes namely a power shoe 38 and a pickup shoe 39, positioned in the planes of the series of pickup studs 5 and power studs 4 respectively. These shoes 38 and 39 are of such length as to be capable of simultaneously engaging successive contact studs of the respective series. There is mounted upon each car or vehicle a storage battery 40, which supplies a local pick-up circuit on the car, to enable the automatic relay system to be set in operation when the car leaves the car barn or after the power has been temporarily shut off. This local battery circuit is controlled by a manually operated switch 41 which when in one position of adjustment, serves to connect the local storage battery into the pick-up circuit, and in an opposite adjusted position connects the battery into the power circuit for recharging, in addition to which it is capable of an intermediate or neutral position. Extending parallel with the track is a current supply conductor 42, which may be carried in elevated position upon poles, or may be an underground conductor, as best suited to the conditions of service.

Referring to the diagrammatic illustration of the operating circuits in Fig. 1, and assuming that ample current is being supplied thru the conductor 42, the operation is as follows:

*Operation.*—To initially pick up the power, and set in operation the relay system, the control switch 41 is depressed, bringing the normally insulated conducting surfaces 43 and 44 of the switch member into engagement with the switch blades 45 and 46 respectively. The current will then flow from the battery 40 thru the line 47 to the engaging contacts 43 and 45, thence thru the lines 48 and line 49 to the pickup shoe 39 upon the vehicle which is in engagement with a pick-up stud 5. The pick-up stud 5 is connected thru a conductor 50 with the fine wire winding or shunt winding of the magnetic coil 33, the opposite side of which is grounded thru the line 51 upon the track rail 1. The current thence passes thru the wheels of the vehicle which are grounded upon rail 1 to a line 52, grounded upon the vehicle truck or frame and thence thru such line 52, to the switch contact 46 and 44, returning thence to the battery thru the line 53 so completing the local circuit. This local battery circuit excites the electro-magnetic coil 33 to attract the oppositely disposed series of independently movable contact arms 35. One series of these movable contact arms is electrically connected as at 54 with the supply conductor 42. The opposite series of contact arms 35 are electrically connected by the line 55 thru the series winding of the electro-magnet 33, and line 56 with the power stud 4. The attraction of the arms 35 to close electrical contact with the common contact bar 37, thus establishes a power supply line, from the conductor 42, thru the line 54 to one series of contact arms 35 thence thru the contact blocks 37 to the opposite series of arms 35 thence thru the line 55, and electro-magnetic coil 33, and line 56 to the power stud 4. This current serves to further excite the coil 33 and increase the pull to insure the firm holding of the contact arms 35 in closed position. The power shoe 38 being in contact with the power stud 4 conducts the current thence from such shoe thru a line 57 to the vehicle controller 58 from which it is carried thru a line 59 to the driving motor 60, the opposite side of which is grounded upon the vehicle truck or frame, which by its engagement with the track rails completes the power circuit thru the rail or ground to the power house or source of supply.

For the purpose of relaying the current supply automatically thru successive contact studs a pick-up shunt circuit leads from the line 57 adjacent to the controller 58 thru a line 61 which includes a fuse 62 and resistance 63, to a contact blade 64 which is normally closed with a contact 65, thence thru resistance 66 to the line 49, which as before described leads to the pick-up shoes 39. The pick-up current passes from the shoe 39 to the pick-up stud, thence thru the line 50 the shunt winding of the coil 33, and line 51 to ground upon the rail. This pick-up circuit to which current is supplied from the main supply conductor 42, serves to operate the circuit closing mechanism in the same manner as the battery circuit. As the car or vehicle progresses along the track, the engagement of the pick-up shoe 39 and power shoe 38, with successive studs before leaving the preceding stud from which they are receiving current, serve to actuate the circuit closing device pertaining to each succeeding pair of studs. This relay of power current continues progressively throughout the length of the track. So long as the manual control switch 41 remains in neutral position, the contacts 64 and 65 will remain closed. However, upon an elevation of the switch 41, the switch contacts 43 and 44 are brought into engagement with the contact blades 64 and 67 respectively flexing the blade 64 out of electrical engagement with the contact 65 thereby cutting the resistance 66 out of the pick-up circuit, and substituting the battery 40, therefor, so that the pick-up current will flow from the line 61 thru the contacting points 64 and 43, thence thru the line 47 to the battery, and from the battery thru the line 53 to the switch contact 44, thence thru the contact 67 to the line 49 and pick-up shoe as before described. The current continues to flow thru the battery until the battery is fully charged, whereupon the switch 41 being returned to neutral or intermediate position disconnects the battery and permits the resistance 66 to be returned to this circuit. The resistance 66 merely balances the battery when the battery is out of the circuit.

In those instances in which the circuit controlling mechanism is offset beside the track and connected by branch conductors with the contact studs in the path of travel of the vehicle, the container or housing 26 is preferably mounted upon a foundation block 68 of concrete or is otherwise mounted upon a firm foundation, and is enclosed in an inverted container or bell 69, which extends somewhat below the level of the housing or box 26. This inverted container or bell 69 serves to protect the circuit closing mechanism and is of comparatively heavy material. This construction is clearly shown in Fig. 3. The bell 69 and box or housing 26 may be of sufficient size to enclose two sets of circuit closing mechanism. Such a duplex set is desirable in double track constructions as by this means the number of housings or stations is decreased.

*Insulated system.*—The principle of the insulated or metallic return system is identically the same as that before described. The principal difference is found in the provision of a separate negative conductor for the return side of the circuit in lieu of using the track rails or ground. The use of the negative conductor necessitates an additional series of contact studs electrically connected with the negative conductor and also a negative power shoe upon the vehicle or car to progressively engage the negative stud simultaneously with the engagement with the positive stud by the power shoe heretofore described. There is illustrated in Figs. 7 and 8, the automatic circuit closing mechanism as heretofore described, with modifications which adapt it to the insulated or metallic return system. While Figs. 7 and 8 illustrate the surface contact stud mounted directly upon the lid of the box or housing containing the circuit closer, it will be understood that this mechanism is likewise capable of use with the detached studs shown in Figs. 12 to 15 and heretofore described. Whereas in the open or grounded system, the current is passed from one contact arm or armature arm thru the interposed contact block 37 to the opposite series of arms, in its passage to the vehicle, the insulated or metallic return system differs therefrom in that the current passes thru one series of contacting arms or armature arms, to the operating mechanism and returns thru the opposite series of contact or armature arms. To this end in lieu of a single contact bar common to the opposite contact or armature arms of both series, there are employed separate contact bars 70 for each series of arms. These bars 70 are of the same shape and general construction as the contact 37 and are mounted in a similar manner between the side frames or plates 30 and in transverse relation with the electro-magnet 33. Each contact 70, however, is continuous and common to all the arms 35 of one series. The electro-magnet is mounted in the same manner as before described, and is wound similarly. The contact or armature arms are mounted in two series for independent oscillatory movement under the influence of the magnet 33 in the same manner as before described. Referring to Figs. 2 and 7, the current is transmitted from the positive or supply conductor 42 thru a line 71 to the supporting shaft of the initial series of oscillatory contact arms 35$^a$ to the contact bar 70 common to the positive series of contact arms. This common contact bar 70 may be carbon, copper, graphite or other electro-conductive material. The contact bar 70 is connected thru the line 72 with the series winding of the electro magnet 33 and thence thru the line 73 to the positive circuit contact stud 4. In the event the control devices are positioned outside the track, the conductor 73 will correspond to the conductor 17 before mentioned. In Fig. 7 the conductor 73 has been shown attached to a clip or connection member 25 carried by the dependent stud 23 of the contact head 20 which comprises the positive power stud and corresponds to the stud 4. This stud being engaged by the positive power shoe 38 the current is transmitted thru the line 57, controller 58, line 59, and motor 60 as before described. However, instead of the opposite side of the motor 60 being grounded upon the frame or truck of the vehicle, it is connected thru a line 74 with the negative shoe 75 carried upon the vehicle. This negative shoe engages with the negative power stud located in the path of travel of the vehicle which power stud is electrically connected with the opposite common contact bar 70 pertaining to the series of contact or armature arms 35$^b$. The series of arms 35$^b$ are electrically connected thru their common supporting shaft, and the line 76 to the negative conductor. In Fig. 7, the common contact bar 70 pertaining to the series of arms 35$^b$ is shown connected directly to the dependent stud 23 of the negative contact stud corresponding to the stud 5. mounted upon the lid of the container. This connection in thru a clip or connector 25, before mentioned. Likewise in Figs. 5 and 7, the container 26 has been shown provided with an outwardly and upwardly turned flange 77, which forms a channel for the conduit thru which the main line positive and negative conductors extend.

The vehicle is provided with the local battery circuit for initial starting purposes, exactly as before described except that instead of being grounded at one side upon the track or frame of the vehicle, it is connected to the negative contact shoe 75. The operation of starting by battery current to initially actuate the circuit closer is exactly as has been described, the current passing from the battery to the pick-up shoe thru the course before traced in connection with the grounded system, passing thence thru the pick-up stud and line 50 to the pick-up winding of the magnet 33, the opposite side of which, however, instead of being grounded upon the track is connected thru a line 78, (Figs. 2 and 7) with the contact bar 70 of the series of contact or armature arms 35$^b$ from which it passes thence thru the line 79 to the negative shoe stud 5 and shoe 75. The electromagnet 33 being initially excited by the battery current when leaving the barn or subsequently by the pick-up circuit, attracts the armature or circuit closing arms 35$^a$ and 35$^b$ into electrical contact with their respective common contact bars 70. The power current thence passes as before traced thru one series 35$^a$. of the contact arms, and its contact bar 70 thence thru the series winding of the coil to the positive stud and to the operating parts of the vehicle returning thence thru the negative shoe and negative stud to the opposite contact bar 70 of the series of contact arms or armature arms 35$^b$ and to the negative conductor. The relay system being thus set in operation, current for the pick-up circuit is shunted from the main power circuit thru the line 61, and successive connections as traced in connection with the grounded system.

While the type of surface contact stud illustrated in Fig. 12 possesses desirable characteristics for permanent trackage, and especially for installation in paved roadbeds, there is illustrated in Figs. 13, 14 and 15, a modified contact stud, particularly adapted for installation in open track work or in trackage of temporary character. This modified type of contact stud comprises a base portion 80 of substantially truncated pyramidal form, adapted to be secured directly to the cross ties by means of lag-screws 81, spikes or other attachment means. Mounted upon the top of the base 80 is a recessed seat 82 of insulating material in which is mounted a rectangular convex metallic contact head 83. The contact head 83, which is preferably of bronze may be of manganese steel or other electro-conductive material, is provided with a pendant stud 84. In the drawing, this stud 84 has been shown as an ordinary bolt, around which the contact head 83 has been cast. It is obvious, however, that the stud 84 may be interconnected with the contact head 83 by any suitable means or process. This pendant stud 84 projects thru an opening in the insulating base 82, and thence thru the top of the pyramidal base 80, from which it is electrically insulated by a surrounding sleeve or spindle 85 of insulating material. The connection of the electrical conductor is made beneath the base 80 to the stud 84 by means of the contact nut 86.

The elongated contact shoes carried by the vehicle assume progressively various tangential positions, in relation with the path of travel in turning curves in the track and so in such turning movement of the vehicle the contact shoes assume a lateral swinging or shifting movement, which instead of carrying the contact shoes longitudinally over the spaced contact studs, causes it to slide or shift laterally in relation therewith.

For installation on curves to accommodate the movement of the contact shoes and maintain operative engagement with the surface contact studs, during such lateral shifting movement, a special type of contact member as illustrated in Fig. 15 is preferably provided for installation in such curved portions of the track. This contact stud is quite similar in construction to that illustrated in Figs. 13 and 14, and in fact Fig. 13 may be considered as a cross sectional view of both Fig. 14 and Fig. 15. For installation upon curves, the base portion 80' of the contact member is elongated and carries two recessed insulating seats 82, arranged in spaced relation one with the other. Seated in these spaced insulators is an elongated contact bar 83' of somewhat arched shape, having a convex top surface, and spaced foot portions 87 engaging within the insulating bases 82. The contact bar is connected to the base 80' by pendant studs 84' similar to those heretofore described which are insulated from the base 80' by sleeves or bushings 85 of insulating material. The electrical conductors are connected with the pendant stud 84, beneath the base 80' by means of the clamp nuts as heretofore mentioned. This construction affords a cheap and economical contact stud which may be easily and quickly installed or removed, having but few parts, and being of substantially unbreakable character which will withstand hard and long usage.

In Figs. 16 to 19 inclusive, there have been shown circuit diagrams illustrating the adaptation of the system heretofore described to two phase and three phase alternating currents, which may be utilized in both the grounded or rail return type and the insulated or metallic return type of installation. The operation of the system and utilizing alternating current is quite similar to the direct current system, heretofore described. The same general type of circuit closers as heretofore described are employed and they are progressively energized by a shunt circuit supplying current from the preceding operated circuit closer of the series. As shown in the diagrammatic view the circuit closers for the alternating current system differ slightly in their detail construction from those heretofore described, in that the magnetic coil comprises only a single or shunt winding. The action of the circuit closers, however, under the influence of this single wound magnet, is the same as heretofore described.

Referring particularly to the three phase grounded or rail system shown in Fig. 18, the circuit closer employed is of the type illustrated in Fig. 7, having independent contact studs 70 for the oscillatory circuit closing or contact arms 35. These circuit closer arms are within the field of influence of the shunt winding 33' whereby the contact or circuit closer arms 35 are actuated into engagement with the contacts 70. The circuit closers or contact arms 35 are arranged in multiple as before described, one series of these arms being connected with the A phase conductor, while the other series is connected with the B phase conductor, the third or C phase being grounded. One of the contact members 70 engaged by one series of arms 35 is electrically connected thru the line 73' with the power stud 4', while the other contact member is connected thru the line 76' to the second power stud 4ª. The pick-up stud 5' is connected to the line 50 with the shunt winding 33' and thence thru the line 51', with ground or with the rail.

The initial actuating current for the circuit closers is supplied from the local battery 40' carried upon the vehicle, which as shown in the diagram is brought into the circuit by means of an ordinary double pole single throw line switch. Upon the closing of this pick-up switch, current flows from the battery 40', thru the line 47' to the switch blade 41', and switch contact 45' thence thru the line 49' to the pick-up shoe 39', and stud 5' as heretofore described. The current then passes thru the line 50' and winding 33' and line 51' to ground upon the track. The current passes thence to the wheels of the vehicle in engagement with the track rails, and thru line 52' grounded upon the vehicle frame to the switch contact 46', switch blade 44' and line 53', back to the battery. This completes the initial shunt circuit, or battery circuit for temporary use in placing the system in operation. The shunt winding 33' being energized by battery circuit attracts the circuit closer arms 35 into engagement with their respective contacts 70, thereby closing the power circuit from the phase conductors A, and B, thru the respective contact arms 35 and contacts 70, to the power studs 4 and 4ᵃ, which are engaged by the vehicle carried contact shoes 38 and 75. These shoes are in turn connected thru the lines 57 and 74, with the controller and motor upon the vehicle as heretofore described. For the continuation of pick-up current, after the initial inauguration of the pick-up action, a shunt circuit 90 bridged across the lines 57 and 74, energizes a rectifier 91. This rectifier may be of any suitable or convenient construction, of which there are several now in common use. The preferred type of rectifier, although not an essential type, is that now known to the trade as "Tungar" rectifiers. A rectifier of this type comprises a glass bulb somewhat of the incandescent light type, having therein a low voltage filament, in proximity to an electrode known as the anode, the bulb being charged with an inert gas. The combination of the heated filament and the body of inert gas, makes it possible for current to flow in but one direction, i. e., from the anode to the cathode. Therefore, only uni-directional or direct current can flow from the rectifier. In conjunction with such rectifier, there is employed a compensator, and reactance, to adjust the current and voltage of the alternating supply to the output of the rectifier. Such rectifier forming no part of the present invention per se, and being a desirable, but non-essential element has been illustrated only diagrammatically upon the drawing, as at 91. This rectifier is in constant electrical communication with the battery 40' and supplies current to recharge the battery, after the inauguration of the pick-up system under the sole influence of battery current. As is well known a rectifier of this type, affords a pulsating or undulating current output. The battery 40' is permanently carried upon the line in conjuniction with the rectifier, and after accumulating its recharge it serves to equalize or compensate the rectifier pulsations. In other words, the local battery 40' may be said to "float" upon the pick-up circuit for the purpose of "filling out" or "building up" the pick-up circuit intermediate pulsations of the rectifier, whereby substantially uniform pick-up current is afforded. The double blade pick-up switch remaining closed, enough current follows the pick-up course, as before traced. The single difference is, that instead of being derived solely from the local battery 40', the pick-up current is supplied from the power circuit thru the medium of the interposed rectifier 91.

It is obvious that in lieu of the rectifier, a motor generator may be employed. In such event the motor element would be bridged across the lines 57, 74, in the shunt 90, while the generator elements actuated thereby would supply recharging current to the local battery 40', and thereafter pick-up current to the system.

In the insulated or metallic return, three phase system, the construction and operation is exactly the same as heretofore described, with the exception that in lieu of grounding the third or C phase, an additional conductor is provided, to which are electrically connected a third series of circuit closer arms 95, which engage corresponding contacts, 96, which are in turn connected to a line 97, with a contact stud 98, of an additional power series located in the path of travel of the vehicle. This series of additional power studs, is engaged by a contact shoe 99, carried by the vehicle, and electrically connected with the controller thereon. The additional contact arms 95, may comprise a portion of the original series of contact arms 35, but are preferably an additional series of such arms, controlled by a second pick-up shunt winding 33', connected in series with the winding originally described. For convenience of manufacturing and installation, for such systems of closed or metallic return alternating current, whether two phase or three phase, duplex circuit closer mechanism is employed mounted in a single mounting, with the opposite series of contact or circuit closer arms of one unit connected with two of the conductors, and a third conductor connected to one series of contact or circuit closer arms of the second unit, the winding of the respective units being connected in series, to be operated simultaneously by the transmission of current thru the pick-up circuit as before traced.

The descriptions directed to Figs. 18 and 19 relative to the three phase system, applies equally to the two phase system, whether of grounded or metallic return type, disclosed in Figs. 16 and 17. It is to be noted that in Fig. 16 the two phase transformer is grounded just as is the C phase of Fig. 18 whereas in Fig. 17, the corresponding or ground line connection is conducted thru an additional set of circuit closer arms and additional series of surface contacts, exactly as shown and described in connection with Fig. 19.

To prevent any possible arcing or short circuiting of the circuit controllers, an insulating element 100 of inverted T-shape is preferably though not necessarily interposed between the supporting shaft 34 and electrical connection of the oscillatory circuit closer or contact arms 35, as shown particularly in Fig. 7.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise but one of several modes of putting the invention into effect, and the invention is therefore claimed in any of its forms or modifications with the legitimate and valid scope of the appended claims.

Having thus described our invention, we claim:

1. In an electrical traction system, a source of electrical energy, a vehicle, a plurality of normally disconnected spaced contacts in the path of travel of the vehicle, contact means carried by the vehicle and progressively engaging the spaced contacts, a series of circuit closers for connecting the contacts with the source of electrical energy, each circuit closer having therein two independent circuit closing elements, the operation of both of which is necessary to complete the electrical connection to the corresponding spaced contact, and means for closing said circuit closing elements in unison.

2. In an electrical traction system, a source of electrical energy, a vehicle, a plurality of normally disconnected spaced power contacts in the path of travel of the vehicle, contact means carried by the vehicle and progressively engaging the spaced contacts, a series of circuit closers for connecting the power contacts with the source of electrical energy, each circuit closer having therein two independent circuit closing elements, the operation of both of which is necessary to complete the electrical connection to the power contact, and means common to both circuit closing elements for closing the same in unison.

3. In an electrical traction system, a source of electrical energy, a vehicle, a plurality of normally disconnected spaced contacts in the path of travel of the vehicle, contact means carried by the vehicle and progressively engaging the spaced contacts, a series of circuit closers for connecting the contacts with the source of electrical energy, each circuit closer having therein two independent circuit closing members, the operation of both of which is necessary to complete the electrical connection to the corresponding spaced contact, an electro-magnet controlling the circuit closing members and means for energizing the magnet by current supplied thru a previously operated like circuit closer.

4. In an electrical traction system, a source of electrical energy, a vehicle, a plurality of normally disconnected spaced contacts in the path of travel of the vehicle, contact means carried by the vehicle and progressively engaging the spaced contacts, a series of circuit closers for connecting the contacts with the source of electrical energy, each circuit closer having therein two independent circuit closing members, the operation of both of which is necessary to complete the electrical connection to the contact, an electro-magnet, an independently movable armature therefor actuating the circuit closing members, and means to intermittently energize the magnet.

5. In an electrical traction system, a source of electrical energy, a vehicle, a plurality of normally disconnected spaced contacts in the path of travel of the vehicle, contact means carried by the vehicle and progressively engaging the spaced contacts, a series of circuit closers for connecting the contacts with the source of electrical energy, each circuit closer having therein two independent circuit closing contacts, the operation of both of which is necessary to complete the electrical connection to the contact, two oppositely disposed independently movable armatures, carrying the movable elements of said contacts, an electro-magnet interposed between said armatures attracting said armatures one toward the other to close the contacts and means to intermittently energize the magnet.

6. In an electrical traction system, a source of electrical energy, a vehicle, a series of normally disconnected spaced contacts in the path of travel of the vehicle, contact means carried by the vehicle progressively engaging the spaced contacts, circuit controlling means for connecting the contacts with the source of electrical energy, comprising a plurality of independently movable circuit closer contacts connected in multiple, and means for actuating said circuit closers in unison whereby the circuit will be closed by one or more of said circuit closers independent of the operation of the remainder of the circuit closers of the series.

7. In an electrical traction system, a source of electrical energy, a vehicle, a series of normally disconnected spaced contacts in the path of travel of the vehicle, contact means carried by the vehicle progressively engaging the spaced contacts, circuit controlling means for connecting the contacts with the source of electrical energy, comprising a plurality of vibratory armature arms, a duplicate contact closed by each arm independent of the operation of another arm, whereby the circuit is completed by the action of any one or more of said arms.

8. In an electrical traction system, a source of electrical energy, a vehicle, a series of normally disconnected spaced contacts in the path of travel of the vehicle, contact means carried by the vehicle progressively engaging the spaced contacts, circuit controlling means for connecting the spaced contacts with the source of electrical energy, comprising a plurality of make and break contacts connected in multiple, means common to all of said contacts for closing same, the corresponding spaced contact being electrically connected by the closing of any one or more of said contacts independent of the remainder thereof.

9. In an electrical traction system, a source of electrical energy, a vehicle, a series of normally disconnected spaced contacts in the path of travel of the vehicle, contact means carried by the vehicle progressively engaging the contacts, circuit controlling means for intermittently connecting the spaced contacts with the source of electrical energy comprising a plurality of independently operable circuit closers, connected in multiple whereby the circuit will be closed by each circuit closer independent of the operation of any other circuit closer of said plurality, and means for actuating the circuit closers in unison.

10. In an electrical traction system, a source of electrical energy, a vehicle, a series of normally disconnected spaced contacts in the path of travel of the vehicle, contact means carried by the vehicle progressively engaging the contacts, circuit controlling means for intermittently connecting the spaced contacts with the source of electrical energy comprising a plurality of independently operable circuit closers connected in series, whereby each of said circuit closers must be closed to establish such electrical connection, and means common to all the circuit closers for actuating same to closed position.

11. In an electrical traction system, a source of electrical energy, a vehicle, a series of normally disconnected spaced contacts in the path of travel of the vehicle, contact means carried by the vehicle progressively engaging the contacts, circuit controlling means for intermittently connecting the spaced contacts with the source of electrical energy comprising a plurality of independently operable circuit closers, connected in series whereby each of said circuit closers must be closed to establish such electrical connection, and means for actuating said circuit closers in unison.

12. In an electrical traction system, a source of electrical energy, a vehicle, a series of normally disconnected spaced contacts in the path of travel of the vehicle, contact means carried by the vehicle progressively engaging the contacts, circuit controlling means for intermittently connecting the spaced contacts with the sources of electrical energy comprising a plurality of independently operable circuit closers arranged in separate series, the circuit closers of each series being connected in multiple, and the circuit closers comprising the different series being connected in series, and means for controlling the action of said circuit closers.

13. In an electrical traction system, a source of electrical energy, a vehicle, a series of normally disconnected spaced contacts in the path of travel of the vehicle, contact means carried by the vehicle progressively engaging the contacts, circuit controlling means for intermittently connecting the spaced contacts, with the source of electrical energy comprising a plurality of independently operable circuit closers, arranged in separate series, the circuit closers of each series being connected in multiple, and the circuit closers comprising the different series being connected in series, and actuating means common to a plurality of circuit closers of each series.

14. In an electrical traction system, a source of electrical energy, a vehicle, a series of normally disconnected spaced contacts in the path of travel of the vehicle, contact means carried by the vehicle progressively engaging the contacts, circuit controlling means for intermittently connecting the spaced contacts with the source of electrical energy comprising a plurality of independently operable circuit closers, arranged in separate series, the circuit closers of each series being connected in multiple, and the circuit closers comprising the different series being connected in series, and actuating means common to a plurality of circuit closers of both series.

15. In an electrical traction system, a source of electrical energy, a vehicle, a series of normally disconnected spaced contacts in the path of travel of the vehicle, contact means carried by the vehicle progressively engaging the contacts, circuit controlling means for intermittently connecting the spaced contacts, with the source of electrical energy comprising a plurality of independently operable circuit closers, arranged in separate series, the circuit closers of each series being connected in multiple, and the circuit closers comprising the different series being connected in series, and means tending to actuate a plurality of circuit closers of each series in unison.

16. In an electrical traction system, a source of electrical energy, a vehicle, a series of normally disconnected spaced contacts in the path of travel of the vehicle, contact means carried by the vehicle progressively engaging the contacts, circuit controlling means for intermittently connecting the spaced contacts with the source of electrical energy comprising a plurality of independently operable circuit closers arranged in separate series, the circuit closers of each series being connected in multiple, and the circuit closers comprising the different series being connected in series, and means tending to actuate a plurality of circuit closers of both series in unison.

17. In an electrical traction system, a conductor of electrical energy, a series of normally disconnected spaced contacts, a traveling contact member progressively engaging the spaced contacts, means for intermittently connecting the spaced contacts with the conductor of electrical energy comprising a plurality of independently movable armatures, and electro-magnetic means for actuating the armatures, energized by the circuit closing contacts controlled by the movement of the armatures.

18. In an electrical traction system, a conductor of electrical energy, a series of normally disconnected spaced contacts, a traveling contact member progressively engaging the spaced contacts, means for intermittently connecting each of the spaced contacts with the conductor including a plurality of independently movable armatures, circuit closing contacts controlled by said armatures and connected in series, and electro-magnetic means for actuating the armatures to close the contacts energized by the engagement of the traveling contact member with a spaced contact.

19. In an electrical traction system, a conductor of electrical energy, a series of normally disconnected spaced contacts, a traveling contact member progressively engaging the spaced contacts, means for intermittently connecting each of the spaced contacts with the conductor including a plurality of independently movable armatures, circuit closing contacts controlled by said armatures, and connected in multiple, and electro-magnetic means for actuating the armatures to close the contacts energized by the engagement of the traveling contact member with a spaced contact.

20. In an electrical traction system, a conductor of electrical energy, a series of normally disconnected spaced contacts, a traveling contact member progressively engaging the spaced contacts, means for intermittently connecting each of the spaced contacts with the conductor including a plurality of independently movable armatures, circuit closing contacts controlled by said armatures, separated into two series, the contacts comprising each series being connected in multiple, each series of contacts being connected in series with the contacts of the other series, and electro-magnetic means for actuating the armatures to close the contacts energized by the engagement of the traveling contact member with a spaced contact.

21. An electrically operated circuit closer comprising an electro-magnet, vibratory armature arms overhanging the opposite ends of the magnet and simultaneously attracted thereby, movable contact heads carried by the armatures, contact surfaces engaged by the contact heads upon the attraction of the armatures, said contact head being connected in series, and means to intermittently energize the electro-magnet to attract said armatures.

22. An electrically operated circuit closer comprising an electro-magnet, a plurality of vibratory armatures, therefor, a pair of relatively movable contact members controlled by each armature, said contact members being connected in multiple whereby the circuit will be closed by any one or more of the contacts, and means for intermittently energizing the electro-magnet.

23. An electrically operated circuit closer comprising an electro-magnet, a plurality of vibratory armatures therefor, a pair of relatively movable contact members controlled by each armature, said pairs of contact members being arranged in two series, the contact members of each series being connected in multiple, the respective series of contacts being connected in series, and means to intermittently energize the electro-magnet.

24. A surface contact electric railway wherein a current supply line is progressively connected with each of a succession of sectional conductors in unison with the travel of a vehicle including two spaced switches, both necessary to be closed to connect the suply line with a given sectional conductor, an electro-magnetic winding common to the respective spaced switches, the switches and winding being connected in series by the closing of said switches to supply power current therethrough from the supply line to the sectional conductor, and a shunt circuit closed through the winding by the travel of the vehicle to actuate the switches.

25. In a surface contact traction system, a current supply line, a succession of sectional contacts to which current is progressively supplied in unison with the travel of the vehicle, a feeder branch and a return branch, independently operable normally open switches one in each branch, an electro-magnet common to both switches, and means for energizing the electro-magnet to close both switches.

26. In a surface contact traction system, a current supply line, a succession of sectional contacts to which current is progressively supplied in unison with the travel of the vehicle, a switch on the positive side of such contacts and a second switch on the negative side of said contacts operable independent of the first mentioned switch and means for simultaneously actuating said switches to close the circuit through said contacts.

In testimony whereof, we have hereunto set our hands this 7th day of September, A. D. 1920.

GEORGE L. CAMPBELL.
HARRY G. DAVIS.
HARRY R. NOLL.

Witnesses:
A. KATZ,
PETER KRECKMANN.